Feb. 10, 1948. O. T. McILVAINE 2,435,895
DEW POINT DETECTOR
Filed June 24, 1943
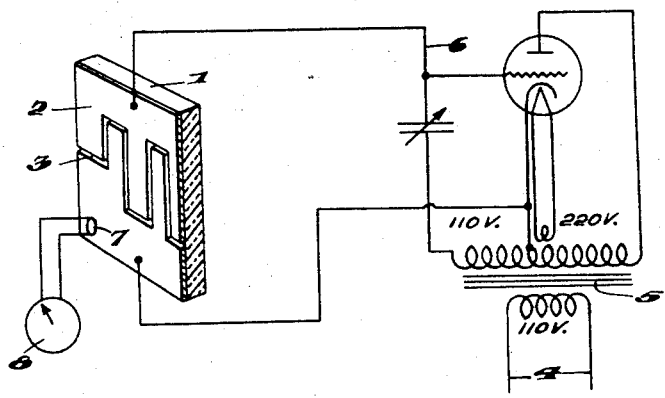
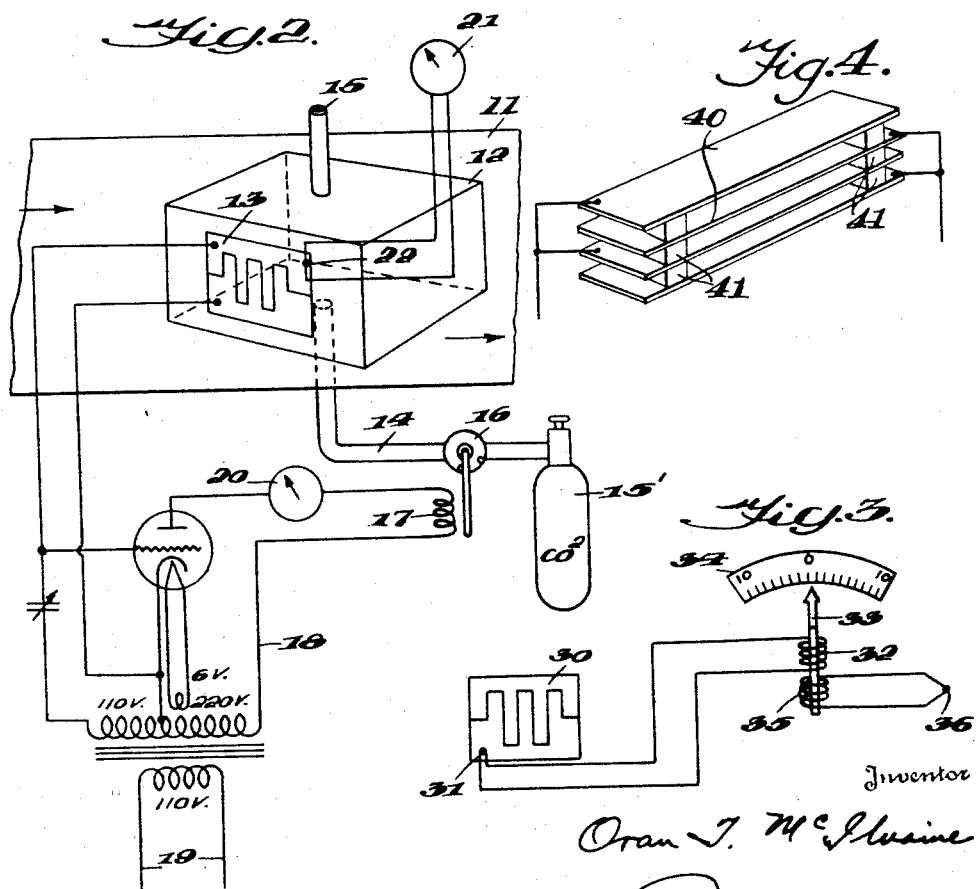
Inventor
Oran T. McIlvaine
By J. Preston Swecker
his Attorney Patented Feb. 10, 1948

2,435,895

UNITED STATES PATENT OFFICE 2,435,895

DEW POINT DETECTOR

Oran T. McIlvaine, St. Charles, Ill.

Application June 24, 1943, Serial No. 492,161

4 Claims. (Cl. 73—17)

This invention relates to an improvement in dew point detectors, of the character designed for the detection of the point where moisture from the air collects and forms on objects with which the air comes into contact.

It is known that the moisture in the air collects on the surfaces of metal, glass and other objects when a predetermined condition of temperature and humidity is reached, but the temperature at which the moisture collects on such objects varies in accordance with the humidity in the air. As the humidity thereof decreases, the temperature of the dew point at which the moisture will collect thereon is also lowered, thereby moving up or down with the humidity. No satisfactory provision has been made heretofore by which the dew point can be determined readily under different conditions.

The determination of the dew point is particularly important in the operation of aircraft, such as airplanes, because of the condensing of the moisture from the air on the metal surfaces thereof which may freeze and seriously interfere with the operation of such airplanes or cause the destruction thereof due to falling. If provision can be made by which the pilot may be forewarned of the dew point, he will know when a dangerous condition of the atmosphere is encountered and can safely maneuver his craft to either a higher or lower altitude out of such dangerous condition of the atmosphere.

Another use to which the invention is particularly applicable is for the determination or control of the humidity in the air supplied to enclosed chambers or rooms, as in the air conditioning of buildings. This is carried out by determining the dew point thereof and indicating the temperature at which the dew point is reached, when the humidity may be determined then readily by reference to the air temperature and a dew point table.

No satisfactory means has been provided heretofore for determining and controlling the dew point under the conditions outlined, and it is the object of this invention to provide for the practical indication or control of the dew point in a simple and inexpensive manner which will have ready applicability in different industries and which may be applied effectively to indicate or determine the humidity of the air.

In carrying out this object, I prefer to employ a grid unit on which the moisture may collect or condense and thereby close an electric circuit through the grid unit or change the resistance thereof, whereby the temperature at the grid unit may be measured to indicate the dew point at which the moisture collects thereon. This grid unit may be of different forms so long as the collection of moisture is utilized to vary the flow of the current in the circuit, when the dew point may then be measured or determined. By holding the grid unit substantially at the dew point at all times, by the application of refrigerant thereto, or otherwise, the humidity of the air in contact therewith may be determined readily by reference to the air temperature and a dew point table.

Different embodiments of the invention are shown in the accompanying drawings, in which:

Fig. 1 is a diagrammatic view of a dew point detector embodying this invention, with the grid unit in section;

Fig. 2 is a diagrammatic view showing the invention applied to the determining of the humidity in an air passage;

Fig. 3 is a diagrammatic view showing the invention applied to a differential meter for determining relative dew point and air temperature; and Fig. 4 is a perspective view showing another or modified form of grid unit.

The invention utilizes a grid unit for varying the operation of the circuit according to the collection or condensing of moisture from the air. As shown in Figs. 1 to 3, this grid unit comprises a supporting plate 1, which is relatively thin and is formed of insulating material, such as glass, mica, or the like. The plate 1 has a thin film of metal evaporated or otherwise applied thereto, as indicated at 2, and a thin line 3 is inscribed along the plate through the metal coating 2 thereon, extending from one side to the other of this metal coating. This separates the latter into two parts insulated from each other by a thin line of space therebetween.

This grid unit is adapted to be connected with a source of electric energy shown at 4, which acts through a transformer 5 to energize a vacuum tube circuit generally designated by the numeral 6 which is connected across the opposite sides of the grid, as shown in Fig. 1.

It will be evident that when the grid unit is cooled, or moist air contacts with the metal surface thereof, the moisture will collect thereon from the air, which will change the resistance of the grid unit or bridge the gap between the sides thereof, thereby closing the electric circuit.

It is desirable to indicate or determine the temperature at which the moisture begins to collect on the grid unit, for which purpose, I have provided a thermo-couple 7 connected with the grid unit and also with a meter 8 which is graduated so as to indicate the dew point temperature, the temperature at which the dew begins to form on the grid unit. This will vary with different conditions of humidity and when the dew point is determined, the humidity of the air can be ascertained readily.

This is shown in Fig. 2, as applied to an air chamber for the purpose of determining the dew point at any time, by maintaining the grid unit at the dew point. In this form, the air conduit or chamber is shown at 11, adapted for the passage of air therethrough, as indicated by the arrows. Located within the air conduit 11 out of communication therewith, is an enclosed chamber 12, having the grid 13 located at the side thereof in heat exchange relation with both the inside and outside of the chamber, the inscribed metal surface on the grid being exposed to the air passing through or in the duct 11, as indicated. Provision is made for maintaining the proper condition of temperature in the chamber 12 for which purpose inlet or outlet pipes 14 and 15 are connected to different sides thereof, the inlet pipe 14 being shown as connected with a cool medium or refrigerant, such as carbon dioxide, as indicated at 15'.

The inlet pipe 14 has a valve 16 therein for controlling the supply of refrigerant to the chamber 12, which valve 16 is controlled by a relay or solenoid coil 17 connected with the vacuum tube circuit designated generally by the numeral 18. Opposite sides of the circuit 18 are connected with the opposite sides of the grid 13, so that the energizing of the circuit will vary according to the passage of current across the grid, resulting from the collection of moisture thereon from within the duct. A source of electrical supply, 110 volt alternating current, for the circuit 18 is shown at 19, connected through a transformer with the grid and cathode of the vacuum tube, providing practically constant voltage therefor.

A meter 20 is connected in the vacuum tube circuit 18 in series with the solenoid valve coil 17, and is graduated so as to indicate the amount of refrigerant necessary to hold the grid 13 at the dew point, or the amount of the refrigeration being supplied for this purpose. A meter 21 is also used, preferably connected with a thermo-couple 22 applied to the grid 13 to indicate the dew point temperature.

In this form, the grid is held substantially at the dew point, which is indicated on the meter 21 by supplying the necessary refrigerant to the grid for automatically maintaining its condition at the dew point. When there is no dew or moisture on the grid 13, the valve 16 will then be normally open, supplying refrigerant to the chamber 12, thereby cooling the grid 13. This continues until the grid reaches the dew point when a spot of moisture collects thereon, closing the vacuum tube circuit 18 through the relay or solenoid coil 17.

The energizing of the latter partly closes the valve 16, thereby modulating the supply of refrigerant or cooling substance to the chamber 12, allowing the grid 13 to start to be warmed and the dew partly removed therefrom by the current of air through the passage 11. This partly deenergizes the vacuum tube circuit 18, allowing the valve 16 to partly return to its normal open position again supplying the necessary cooling substance to the chamber 12 to cool the grid 13 to its dew point when its temperature will be indicated on the meter 21. This system is completely automatic, inasmuch as the grid will be maintained at its dew point, supplying only sufficient refrigerant to hold it in this condition.

In practice, the valve 16 is never completely open or closed, but is modulating from a minimum to a maximum point, holding the spot of moisture on the grid to a certain size. This gives a much better control than would an on or off action. As more moisture forms, valve 16 moves toward a closed position. As the spot starts to evaporate, the valve 16 starts to open and the plate cools and the spot then gets larger again. This modulates to hold the spot substantially constant.

While the meter 21 indicates only the dew point temperature, this is sfficient to determine the humidity of the air in the duct 11 by reference to the air temperature and a dew point table whereby the humidity of the air in the duct may be varied as desired in any suitable manner.

The dew point meter may be combined with a temperature responsive element to indicate the difference between the dew point temperature and the air temperature, if desired, as indicated in Fig. 3. As here shown, the grid is indicated at 30 provided with a thermo-couple 31 connected with a coil 32. The coil 32 is associated with an indicator arm 33 to influence the latter in one direction, so as to move it over a scale 34. A second coil 35 is also associated with the arm 33 tending to move the latter in the opposite direction. The coil 35 is connected with an air temperature responsive element designated generally by the numeral 36. The coils 32, 35 act on the arm 33 as a differential meter, influencing said arm to move in one direction or the other according to the relative temperatures at the grid 30 and the outside air. This difference of temperature will thus be indicated on the scale 34 in response to the differential action of the coils 32, 35.

Another form of grid unit is shown in Fig. 4 in which thin metallic plates 40 are held in closely spaced relation by insulating blocks 41 interposed therebetween, and alternating plates are adapted to be connected with different sides of the vacuum tube or current supply circuit. As frost occurs due to the condensing of moisture on the plates, this will establish a circuit therebetween that will be more or less effective according to the condition of moisture, whereby the dew point temperature may be determined by a thermo-couple or otherwise as described above.

I claim:

1. The combination with an air passage, of a hollow unit located therein and adapted for the collection of moisture on said unit from the air in said passage according to a variation in temperature between the interior of the unit and the air passage, an electric circuit having a grid connected therein, said grid having current conducting spaced parts insulated from each other and constructed for the collection of moisture thereon from the air passage to connect said parts together and close the circuit causing current flow therethrough in proportion to the condition of moisture on the grid, said grid being in heat exchange relation with the interior of the hollow unit, means for supplying a refrigerated medium into said hollow unit, and means connected with said circuit and constructed for action in response to current flow therein for controlling the action of said medium supply means to vary the supply of refrigerated medium therein according to the current flow in the circuit.

2. The combination with an air passage, of a hollow unit located therein and adapted for the collection of moisture on said unit from the air in said passage according to a variation in temperature between the interior of the unit and the air passage, an electric circuit having a grid connected therein, said grid having spaced parts insulated from each other and constructed for the collection of moisture thereon from the air passage to connect said parts together and close the circuit according to the condition of moisture on the grid, said grid being in heat exchange relation with the interior of the hollow unit, means for supplying a refrigerated medium into the hollow unit, said refrigerated medium supply means including a valve, and means connected with said circuit for controlling the operation of said valve to vary the supply of refrigerated medium into the unit.

3. A device for determining dew point temperature comprising an electric circuit having a grid connected therein, said grid including an insulating plate having metallic sheets extending over the surface thereof and with adjacent edge portions spaced from each other and adapted for the collection of moisture thereon from the air, said circuit including means for indicating variations in current flow therein according to variations in the amount of moisture collected in the grid, and means for indicating the temperature at which the moisture begins to collect on said grid.

4. The combination with an air passage, of a hollow unit located therein adapted for the collection of moisture thereon from the air in said passage, an electric circuit, a grid including spaced circuit closing means and connected in heat exchange relation with said unit, said spaced circuit closing means being connected in the circuit and constructed for closing the circuit upon the collection of moisture on said grid for varying the current flow through said circuit according to the condition of moisture collected on the grid, refrigerating means connected with said unit and constructed for supplying cooling air into the unit to vary the collection of moisture on said grid in response to variations in temperature in said unit, and means operative in response to the current flow in the circuit for controlling the action of said refrigerating means.

ORAN T. McILVAINE.

REFERENCES CITED

The following references are of record in the file of this patent:

UNITED STATES PATENTS

| Number | Name | Date |
| --- | --- | --- |
| 1,789,268 | Anderson | Jan. 13, 1931 |
| 1,883,116 | Tomlinson | Oct. 18, 1932 |
| 1,893,847 | Simpson | Jan. 10, 1933 |
| 2,240,082 | Thornthwaite | Apr. 29, 1941 |
| 2,268,785 | Thornthwaite | Jan. 6, 1942 |

FOREIGN PATENTS

| Number | Country | Date |
| --- | --- | --- |
| 317,306 | Great Britain | Aug. 12, 1929 |
| 364,721 | Italy | Nov. 12, 1938 |
| 538,287 | Great Britain | July 28, 1941 |

OTHER REFERENCES

Pages 8 to 13 of Circular No. 20, University of Illinois Engineering Experiment Station, year 1929. U. S. Patent Office Library, Washington, D. C., identification TA-417-I3.